Jan. 13, 1931.  F. W. KOSFELD  1,789,237
SCREW TAP
Filed Nov. 3, 1928
Fig. 1.    Fig. 2.    Fig. 3.
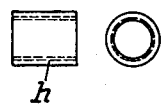
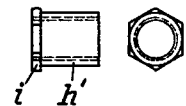
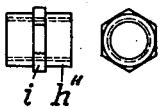
Fig. 4.
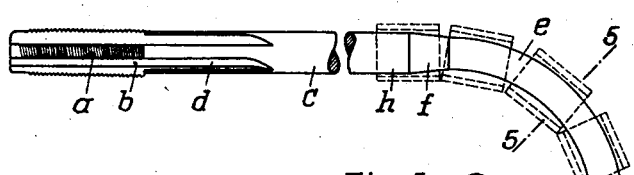

*Inventor:*
FRIEDERICH WILHELM KOSFELD
*by his attorneys*
Howson and Howson

Patented Jan. 13, 1931

1,789,237

UNITED STATES PATENT OFFICE

FRIEDRICH WILHELM KOSFELD, OF BRACKWEDE, GERMANY

SCREW TAP

Application filed November 3, 1928, Serial No. 316,953, and in Germany November 11, 1927.

This invention relates to screw taps having curved shanks for use in screw threading pipe sockets or sleeves such as are used for gas pipes. Up to the present time the thread was cut in these pipe sockets on machines by means of straight shanked screw taps. This had the drawback that the sockets in any desired number did not automatically run off continuously from the screw tap, the straight screw tap having to be detached from its chuck or holder after a few tappings had been effected in order to strip off the sockets. If the sockets were allowed to run off in large numbers, the screw tap had to be made of an unusual length. In tapping pipe sockets it is not possible to use curved shanked screw taps such as are used for low nuts, because the sockets are of such a length that they bind on a sharply curved shank. To give the curved shank sufficient radius to enable the sockets to run off freely is out of the question because the chuck would then be of excessive dimensions.

According to the present invention, the screw tap having curved shank is rendered suitable for thread cutting in pipe sockets by giving the curved shank a smaller cross section than that of the straight guide shank of the screw tap. As a rule, it is sufficient to keep the cross section of the curved shank of smaller diameter than that of the straight guide shank of the tap, more particularly for sockets with thin walls, for instance up to 2 mm., which are to be given a fine thread. For pipe sockets of larger dimensions, that is to say for instance greater than 2 mm. thick which are threaded with a coarse thread, it is advisable however to keep the curved shank as strong as possible. For that reason, the cross section of the curved shank is formed elliptically.

Moreover, care must be taken in the present tap to prevent the shavings which are produced during the cutting of the thread, from remaining in the interior of the sockets and jamming during the running down from the screw thread part of the tap on the straight and on the curved shank. For that reason, the flutes of the straight non-threaded shank, which adjoin the flutes of the screw threaded part of the tap, are of greater length than the length of the pipe sockets.

The invention is illustrated in the accompanying drawing, in which,

Figures 1 to 3 show examples of the usual pipe sockets in which a thread is to be cut, in plan and side elevation.

Figure 4 shows the tap in elevation,

Figure 5:
Figure 5 is a section through the curved shank on line 5—5 of Figure 4.

The screw tap as shown in Figure 4 has a straight shank $c$ with screw thread cutting surfaces $a$ on the front end, the cutting surfaces being divided, as usual, by flutes $b$. In order to allow the pipe sockets to run off the cutting surfaces and on along the straight portion of the shank, the flutes $b$ are continued down the shank beyond the cutting surfaces for a distance greater than the length of the pipe sockets. In this way the shavings, made during the thread cutting do not remain in the interior of the socket and jam it as it advances along the shank.

In the present invention the rear end of the tap is curved as at $e$ and is of smaller diameter than the straight shank $c$. This curved end $e$ is joined to the shank $c$ by a conical portion $f$. The curved shank $e$ can be of circular cross section or it may be elliptical as shown in Figure 5, the shorter axis of the ellipse being in the plane containing the curved axis of the shank $e$. The position of the pipe sockets $h$ is shown in dotted lines on the curved shank in Figure 4.

Having now particularly described and ascertained the nature of my said invention, and in what manner the same is to be performed, I declare that what I claim is:—

1. A screw tap adapted to thread articles having substantial length as compared to the thickness of ordinary screw nuts, said tap having a bent end whose cross sectional area is reduced from that of the shank of the tap, the reduction starting at the point of curvature of said end from said shank whereby a succession of the threaded articles may run down the shank and off the bent end of the tap.

2. A screw tap adapted to thread articles having substantial length as compared to the thickness of ordinary screw nuts, said tap having a bent end of substantially elliptical cross section whereby a succession of the threaded articles may run down the shank and off the bent end of the tap.

3. A screw tap, for threading articles of substantial length as compared to the thickness of ordinary nuts, adapted to pass said articles successively off the rear end thereof, thread cutting surfaces on the front end of the tap, said thread cutting surfaces and the shank of said tap being of approximately equal diameter, flutes associated with said thread cutting surfaces, said flutes extending rearwardly of said cutting surfaces for a distance greater than the length of the article being tapped, whereby said articles may be led off the rear end of the tap without hinderance by the shavings formed incident to the thread cutting.

In witness whereof I affix my signature.

FRIEDRICH WILHELM KOSFELD.